United States Patent
Handlogten

(10) Patent No.: US 7,526,638 B1
(45) Date of Patent: Apr. 28, 2009

(54) HARDWARE ALTERATION OF INSTRUCTIONS IN A MICROCODE ROUTINE

(75) Inventor: Glen H. Handlogten, Rochester, MN (US)

(73) Assignee: International Business Machines Corporation, Armonk, NY (US)

(\*) Notice: Subject to any disclaimer, the term of this patent is extended or adjusted under 35 U.S.C. 154(b) by 0 days.

(21) Appl. No.: 12/049,340

(22) Filed: Mar. 16, 2008

(51) Int. Cl.
G06F 9/00 (2006.01)
G06F 9/44 (2006.01)

(52) U.S. Cl. .................. 712/245; 712/226; 712/242; 712/243

(58) Field of Classification Search .......... 712/242, 712/243, 245, 246, 226
See application file for complete search history.

(56) References Cited

U.S. PATENT DOCUMENTS

| | | | | |
|---|---|---|---|---|
| 3,651,482 A * | 3/1972 | Benson et al. | ............... | 712/246 |
| 3,794,979 A * | 2/1974 | McMahon | ................... | 712/226 |
| 4,099,229 A * | 7/1978 | Kancler | ....................... | 712/204 |
| 4,276,594 A * | 6/1981 | Morley | ........................ | 713/600 |
| 5,134,693 A * | 7/1992 | Saini | ........................... | 712/244 |
| 5,185,872 A * | 2/1993 | Arnold et al. | ................ | 712/217 |
| 5,269,008 A * | 12/1993 | Kobayashi et al. | ........... | 712/225 |
| 5,542,060 A * | 7/1996 | Yoshida | ....................... | 712/208 |
| 6,405,305 B1* | 6/2002 | Meier et al. | .................. | 712/222 |
| 2004/0215940 A1 | 10/2004 | Heishi et al. | | |
| 2007/0043531 A1 | 2/2007 | Kosche et al. | | |
| 2007/0234011 A1* | 10/2007 | Abernathy et al. | ........... | 712/217 |

FOREIGN PATENT DOCUMENTS

| | | |
|---|---|---|
| EP | 00466550 B1 | 11/1998 |
| WO | WO09828681 A1 | 7/1998 |
| WO | WO00161478 A2 | 8/2001 |
| WO | WO2006060220 A2 | 6/2006 |

OTHER PUBLICATIONS

V. Carl Hamacher, Zvonko G. Vranesic, Safwat G. Zaky "Computer Organization" Second Edition; McGraw-Hill series in computer organization and architecture; Jun. 1984, pp. 151-164.*

* cited by examiner

Primary Examiner—Eric Coleman
Assistant Examiner—Idriss N Alrobaye
(74) Attorney, Agent, or Firm—MaxValueIP, LLC

(57) ABSTRACT

Processor logic gates are used to modify microcode instructions, while they are being executed. The results of previous operations are used by the hardware to modify subsequent instructions in a microcode routine. This gives the effect of branching and also reduces the number of instructions that are executed. Different examples and embodiments are also discussed.

1 Claim, 2 Drawing Sheets

HARDWARE ALTERATION OF INSTRUCTIONS IN A MICROCODE ROUTINE

BACKGROUND OF THE INVENTION

Parallel processing is an efficient form of information processing of concurrent events in a computing process. Parallel processing demands concurrent execution of many programs in a computer, in contrast to sequential processing. In the context of a parallel processor, multiple instructions are executed simultaneously. Serial execution systems receive their tasks from a single pool or a pipeline of information, while parallel processing systems receive their instructions from a plurality of pipelines capable of performing all tasks in a multithreaded environment. In general, in a parallel system the plurality of the pipelines are focused on the same element of a problem. Certain problems are well suited for a parallel environment.

SUMMARY OF THE INVENTION

The A2 core is a four threaded processor. The floating point divide [fdiv(s)(.)] and floating point square root [fsqrt(s)(.)] instructions are micro-coded. Branching in microcode based on FP (Floating Point) results is difficult. A new interface between the FPU (Floating Point Unit) and the microcode engine in the Instruction Issue Unit would need to be designed to allow this. The FPU would use this interface to write a register visible to the microcode engine. The microcode engine would detect RAW (Read After Write) dependencies and branch based on various bits in this new register.

Because of the complexity, the microcode engine of A2 processor does not support any type of branching in microcode. Instead, the results of previous operations are used by the hardware to modify subsequent instructions in a microcode routine. This gives the effect of branching and also reduces the number of instructions that are executed. Performance is improved both for the thread executing the microcode and for the other threads competing for the processors arithmetic unit.

DETAILED DESCRIPTION OF THE PREFERRED EMBODIMENTS

Figure 1:
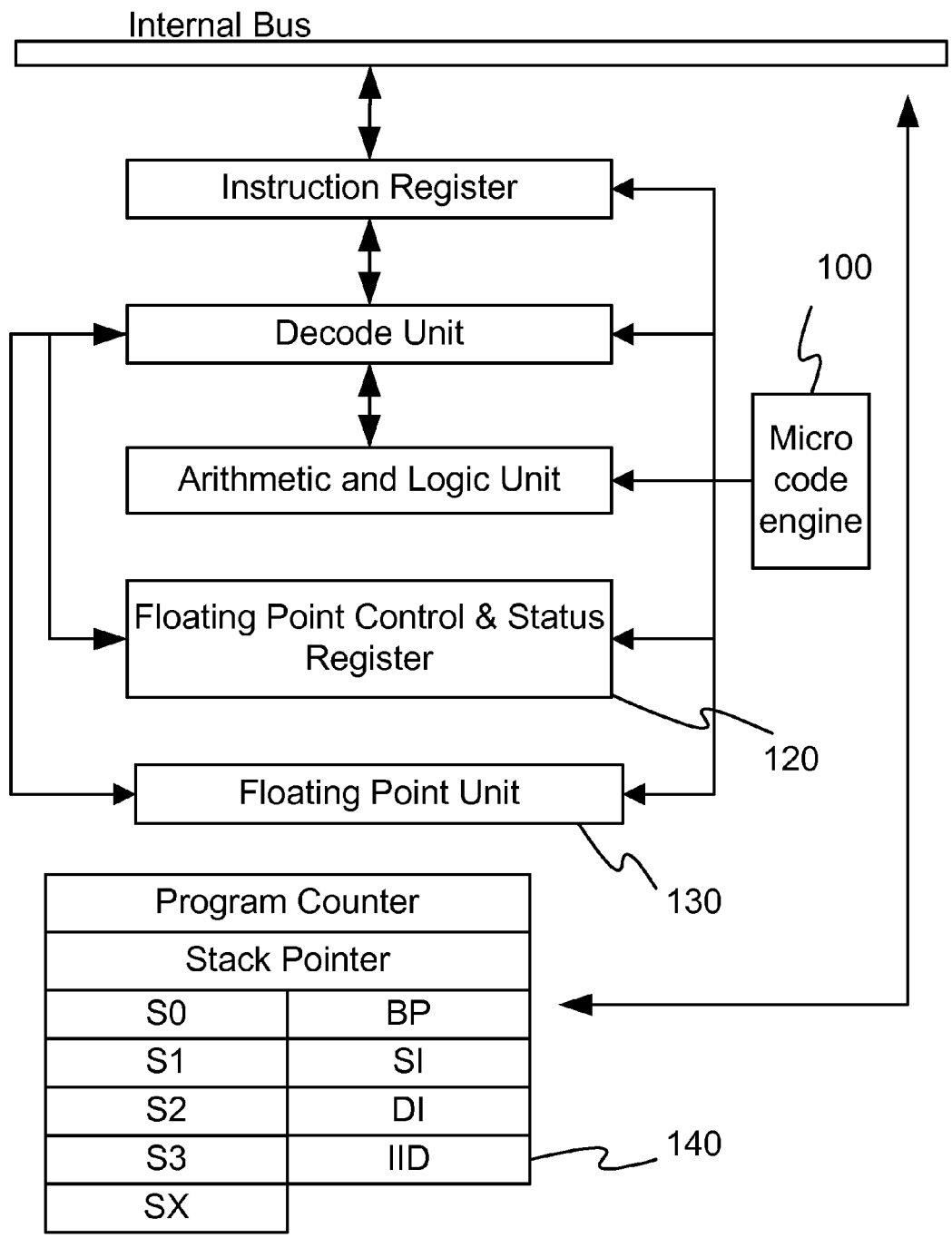
FIG. 1 is a schematic diagram of the system depicting the micro code engine and the Floating Point Unit (FPU) and Floating Point Status and Control Register (FPSCR).

The microcode routine for fdiv(s)(.) and fsqrt(s)(.) was designed knowing that branching would not be available. The microcode routine ends with 3 floating point multiply [fmul(s)(.)] instructions. The 3 multiplies have different source operands but the same target. The intent was to have the microcode engine issue all 3 instructions and use new gating in the hardware to block 2 of the 3 instructions from updating the target FPR 130 (Floating Point Register) and FPSCR 120 (Floating Point Status and Control Register)—selecting which instructions to block based on results of previous operations (202). All 3 instructions would proceed down the FPU's pipeline. (Note that the Floating Point Unit comprises Instruction Alternation Hardware.)

Assume a microcode sequence that handles the majority of operands for divides (or square roots) can be written with n instructions numbered 0 through n-1. In the case of A2 n is about 14. This invention replaces the last 3 instructions (n-3, n-2, n-1) with a single instruction issued by the microcode and altered by the hardware. The decision about which of the 3 instructions should proceed is determined by a prior instruction (202). This could be, for example, the sign of a previous result. The decision can easily be reduced to 2 binary digits (bits) stored in an Instruction ID register 140 (IID). IID is set to "00" when we are not executing instructions related to this invention. IID (204) is set to "11" for instruction n-3; "10" for instruction n-2; and "01" (see e.g., FIG. 2, 203) for instruction n-1. The A2 microcode algorithms for floating point divide and square root use 4 scratch registers (s0-s3). The scratch registers are similar to the 32 floating point registers (FPRs) defined by the PowerPC architecture. However, while the FPRs are available to user code, but the scratch registers can only be accessed by microcode. The single microcode instruction (206, 232) that replaces instructions n-3 through n-1 is coded so that all 3 of its source registers (220) are s0 (e.g., 226). The IID register (204) is re-coded (216) into 3 sets of 2 bits (218) (as shown for example in Table 1, under s0, s1, and s2) that can be ORed (222) into the 3 source address field (224) of the single instruction (208, 234).

TABLE 1

Example of recoding IID into 3 sets of 2 bits, using combination logic, and its effect on 3 source operands

| IID | s0 | s1 | s2 | affect |
|---|---|---|---|---|
| 00 | 00 | 00 | 00 | none (s0, s0, s0) |
| 01 | 11 | 11 | 00 | s3, s3, s0 |
| 10 | 11 | 00 | 01 | s3, s0, s1 |
| 11 | 10 | 00 | 01 | s2, s0, s1 |

Figure 2:
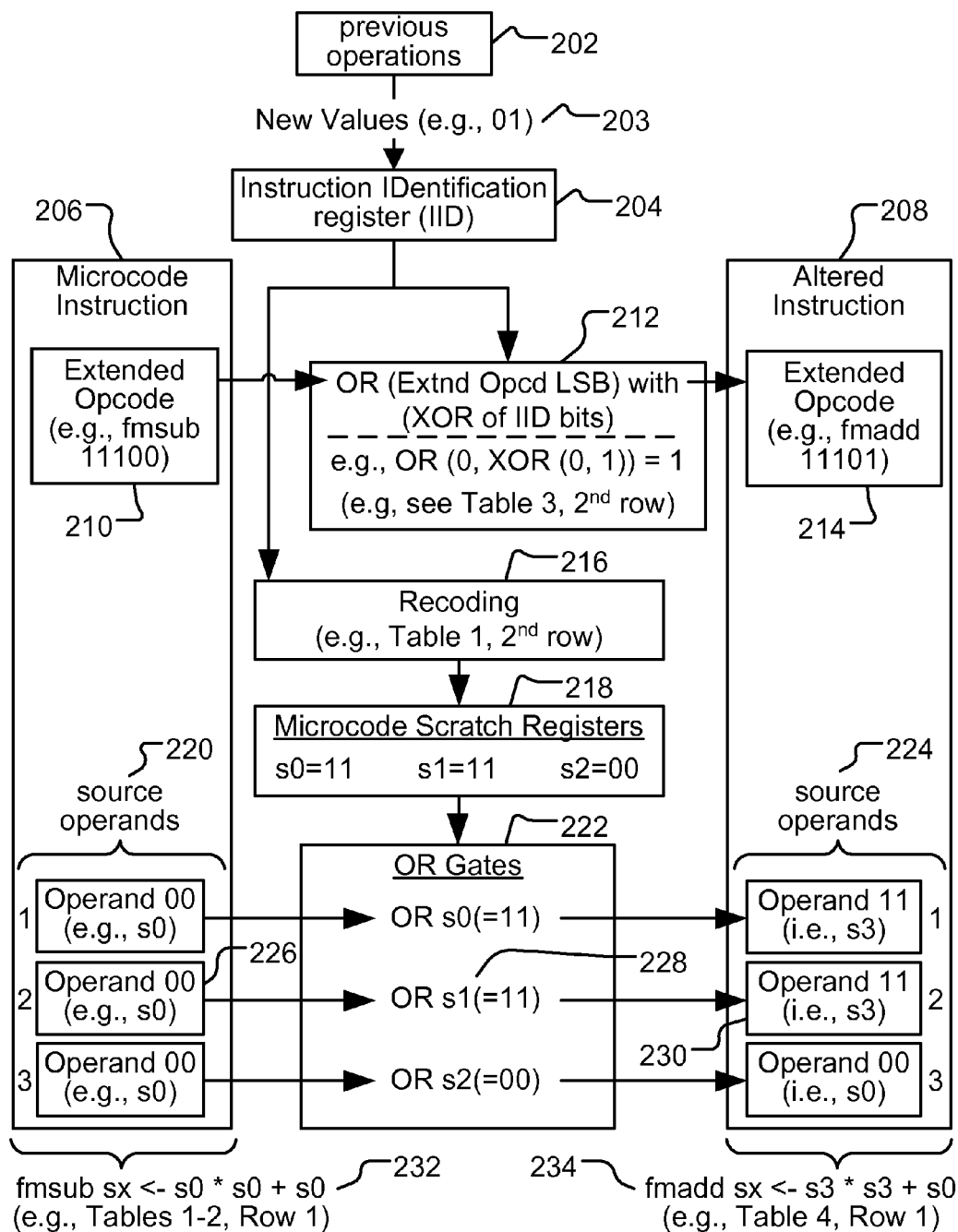
FIG. 2 demonstrates an embodiment of this invention.

The recoding from IID to s0, s1, and s2 is trivial. In the above example, the most significant bit of S0 is the logical OR of the 2 IID bits and the least significant bit of S0 is the XOR or the 2 IID bits. For example, for IID=01 (Table 1, $2^{nd}$ row; FIG. 2, 203), the logical OR of 2 IID bits (i.e., 0 OR 1) is 1 which is recoded as the most significant bit of s0 (i.e., 1), and XOR of the two IID bits (i.e., 0 XOR 1) is 1 which is recoded as the least significant bit of s0. Other sets (i.e., s1 and s2 values) are similarly recoded using combination logic. For example, according to the example illustrated in Table 1, s1 is recoded to '11' for IID of '01', otherwise, it is recoded to '00'; therefore, a simple combination logic (e.g., IID least significant bit AND NOT IID next significant bit) will recode s1 per the example in Table 1. Similarly, s2 can be recoded, for example, by setting its most significant bit to 0 and its least significant bit to most significant bit of IID. Since IID=00 generates s0='00' s1='00' and s2='00' a simple OR (222) rather than a select is used to alter the source fields (220, 224) of the instruction (206, 208).

As illustrated in Table 1, the recoded values from IID are stored in scratch registers s1, s1, and s3 (see also 218). As mentioned above, since these 3 values are ORed to source operands (220) (to alter the operand values from '00') (e.g. see 226), these 3 recoded values signify the 3 altered (source) operands (224). For example, (as shown in Table 1, $2^{nd}$ row) for IID=1, the recoded values, s0='11', s1='11', s2='00', affect the three source operands (220) by altering (222) them to s3, s3, s0 (224) in the altered instruction (208, 234), since the value of s0 (i.e., '11'=3) is used to affect the first operand, the value of s1 (i.e., '11 '=3) is used (228) to affect the second operand (e.g., see 226, 230), and the value of s2 (i.e., '00'=0) is used to affect the third operand.

In the example illustrated in Table 1, for IID=0 (as mentioned above), there is no alteration of the operands (as indicated by 'none' at Table 1, $1^{st}$ row). The values presented in Table 1 are for illustration purposes for this disclosure, and as mentioned above, they are driven by the design to alter the operands to those of 3 replaced instructions depending on IID.

Care must be taken to ensure that operand dependencies (RAW) are honored by the altered instruction. Since the microcode is hand written this is not a difficult matter. For an in-order processor like A2, the scratch register targets must be arranged so that the latest possible source register of the alterable instruction, targets s0. That way a change from s0 to any other scratch register will guarantee the proper operands are available. An out-of-order processor, requires that the alterable instruction (prior to being altered) is coded with all possible dependencies. This is only slightly more restrictive in that it limits the changes to 3 of the 4 possible registers and requires a selector rather than an OR gate to alter the registers.

The same method can be used to alter the extended opcode (210) of the instruction (206, 232). With the Power PC (PPC) instruction encodes, with an example shown in Table 2, simply ORing the IID (e.g., with values 00, 01, 10, and 11, as in Table 1) with the least significant bits of the extended opcode (e.g., 00 of 11100 of fmsub instruction in Table 2, $1^{st}$ row) allows selecting any of the following instructions (e.g., 11100 for fmsub, 11101 for fmadd, 11110 for fnmsub, and 11111 for fnmadd, respectively) as illustrated in Table 2.

TABLE 2

Example of extended opcodes and their corresponding instructions

| Extnd Opcd | Instr |
|---|---|
| 11100 | fmsub |
| 11101 | fmadd |
| 11110 | fnmsub |
| 11111 | fnmadd |

For another example, table 3 shows how the IID can be used to select between fmadd (214) (floating point multiply-add) and fmsub (floating point multiply-subtract) (210). As illustrated in the example of Table 3, for IID of 01 and 10, the altered extended opcode (214) is fmadd and for IID of 11 (as well as 00), the 'altered' opcode is fmsub. For IID=00, as shown in Table $1^{st}$ row, the opcode is not altered (from fmsub, 11100), and its effect is indicated by 'none'.

TABLE 3

Example of microcode instruction opcode alteration based on IID value

| New IID | Opcd | Affect |
|---|---|---|
| 00 | 11100 | none |
| 01 | 11101 | fmadd |
| 10 | 11101 | fmadd |
| 11 | 11100 | fmsub |

The combination logic to make the opcode alteration is again trivial (e.g., for the alteration illustrated in Table 3, one can simply use an XOR gate for 2 bits of IID and use the result as the least significant bit of the altered Opcode, or alternatively, OR the (XOR) result with the least significant bit (LSB) of the extended opcode (212)). For example, when IID=01 (FIG. 2, 212; Table 3, $2^{nd}$ row), XOR of IID bits (i.e., XOR(0, 1)) is 1, and the LSB of the instruction (FIG. 2, 206, 232) extended opcode (FIG. 2, 210), e.g., fmsub (Table 2 and 3, $1^{st}$ row; FIG. 2, 232) is 0 (i.e., LSB(11100)=0). Therefore, ORing the LSB of extended opcode (i.e., 0) with the XOR of the IID bits (i.e., 1) results in 1 (FIG. 2, 212) which alters the LSB of the extended opcode from 0 to 1 (FIG. 2, 210, 214) and changes the extended opcode form fmsub (210) to fmadd (214), as specified in the example of Table 3, $2^{nd}$ row.

Continuing with the above examples (Table 1 for operand alteration and Table 3 for extended opcode alteration) and combining the two alterations together would allow selecting an instruction from examples shown in Table 4 (e.g., FIG. 2, 234) by altering a microcode instruction (FIG. 2, 206, 232) based on IID value:

TABLE 4

Example of instruction alteration based on IID value

| IID | Affect |
|---|---|
| 01 | fmadd sx <– s3 * s3 + s0 |
| 10 | fmadd sx <– s3 * s0 + s1 |
| 11 | fmsub sx <– s2 * s0 – s1 |

For example, as illustrated in Table 4, for IID=01 (Table 4, $1^{st}$ row), the instruction is altered from fmsub sx<-s0*s0-s0 (FIG. 2, 232) to fmadd sx<-s3*s3+s0 (FIG. 2, 234), by altering the extended opcode form fmsub to fmadd and by altering the source operands from (s0, s0, s0) (FIG. 2, 220) to (s3, s3, s0) (FIG. 2, 224), as illustrated in above examples. Similarly, for IID=10 (Table 4, $3^{rd}$ row), the operand alteration alters (s0, s0, s0) operands to (s3, s0, s1) (see Table 1, $3^{rd}$ row), by recoding IID value '10' (to 3='11', 0='00' 1='01' in s0, s1, and s2, respectively), and the extended opcode alteration changes fmsub (11100) to fmadd (11101) (see Table 3, $3^{rd}$ row), by ORing the LSB of the extended opcode (i.e., 0) with XOR of IID bits (i.e., 1).

Note that in the example illustrated in table 4, no row is shown for IID=00 which indicates no alteration to the instruction fmsub sx<-s0*s0-s0 (see Tables 1, 2, 3, $1^{st}$ row).

Using the IID to change the target register is also possible in an in-order processor. For example, if s2 had previously been loaded with the value of X and s3 had previously been loaded with the value of Y, the IID alteration could be used to selectively multiply (s0*s1) by X or Y. This is accomplished with only two instructions. Table 5 shows the modification of the first instruction where (s0*s1) is calculated by either of IID choices of '01' and '10', with IID value altering the destination register from another scratch register to either s3 or s2, respectively, in the altered instruction. As shown in Table 5, $1^{st}$ row, for IID=01, the altered destination is s3 which causes the previously loaded value (Y) in that register to get overwritten by the result (s0*s1) of multiplication. Similarly, as shown in Table 5, $2^{nd}$ row, the altered destination is s2 which causes the previously loaded value (X) in that register to get overwritten by the multiplication result (s0*s1). Once the first instruction is altered and executed, depending on the value of IID, the multiplication result (s0*s1) is stored in either s2 or s3 as shown in Table 5. The second instruction is shown below table 5. As shown by the second instruction, the values stored in s2 and s3 are multiplied and the result is placed in register sx. A shown below, by the time the second instruction (i.e., fmul sx<-s2*s3) is executing, the first (altered) instruction has overwritten the value in either s2 or s3 by (s0*s1), depending on the value of IID; therefore, the second instruction (as shown below), multiplies (s0*s1)

result of the first altered instruction by the non-overwritten value (either X or Y in either s2 or s3, respectively, depending on the value of IID).

TABLE 5

Example of altering the destination register in the first instruction

| IID | |
|---|---|
| 01 | fmul s3 <- s0 * s1 (overwrite Y) |
| 10 | fmul s2 <- s0 * s1 (overwrite X) | fmul sx <- s2 * s3 (sx = s0 * s1 * X if IID = 01, sx = s0 * s1 * Y if IID = 10)

Alteration of the target register can be done independently or in combination with alterations to the opcode and source registers.

An embodiment of the invention is a system for hardware alteration of instructions in a microcode routine, the system is comprised of:

A microcode engine 100, an arithmetic and logic unit, a floating point unit, an instruction identification register, one or more scratch registers, an instruction register, an instruction decoder unit, and an instruction memory. The instruction register fetches instruction words from the instruction memory.

Each of the instruction words comprises of an instruction opcode and multiple operands from one or more source registers and a target register, wherein the one or more source registers correspond to the one or more scratch registers and the target register corresponds to one of the one or more scratch registers.

The instruction opcode performs an arithmetic or floating point operation on the one or more source registers and writes the result in the target register. Moreover, the microcode engine is connected to the arithmetic and logic unit, the floating point unit, the instruction register, the instruction identification register, and the instruction decoder unit, wherein the microcode engine controls integer pipelines and floating point sequences.

The microcode engine interprets the instruction words and microcode entry points fed to it by the instruction decoder unit. The floating point unit or the arithmetic and logic unit write new values to the instruction identification register based on results of previous operations, and the instruction decode logic alters the interpretation of the instruction words based on contents of the instruction identification register. The instruction decode logic under the control of microcode engine recodes the value in the instruction identification register to a recoded value that is used to alter the instruction words. The decode logic alters the instruction opcode and the multiple operands from the one or more source registers and the target register, by logically ORing the recoded value with one of the fields in the instruction word, or by selecting the recoded value instead of one of the instruction fields.

The microcode structure ensures that Read-After-Write operand dependencies are honored by the altered instruction opcode and the multiple operands.

A method, apparatus, or device comprising one of the following items is an example of the invention: hardware, microcode, floating point, FPU, processor, instructions, code, storing the instructions, server, client device, PDA, mobile device, cell phone, storage to store the codes, router, switches, network, communication media, cables, fiber optics, physical layer, buffer, nodes, packet switches, computer monitor, or any display device, applying the system mentioned above, for purpose of hardware alternation of instructions in a microcode routine and its management.

Any variations of the above teaching are also intended to be covered by this patent application.

The invention claimed is:

1. A system for hardware alteration of instructions in a microcode routine, said system comprising:
    a microcode engine with multiple scratch registers;
    an arithmetic and logic unit;
    a floating point unit;
    an instruction identification register;
    an instruction register;
    an instruction decoder unit; and
    an instruction memory;
    wherein said instruction register fetches instruction words from said instruction memory;
    wherein each of said instruction words comprises: an instruction opcode and multiple operands indicating first one or more source registers and a target register;
    wherein said first one or more source registers correspond to first one or more scratch registers of said multiple scratch registers;
    wherein said target register corresponds to a second scratch register of said multiple scratch registers;
    wherein said instruction opcode performs an arithmetic or floating point operation on said one or more source registers and writes the result in said target register;
    wherein said microcode engine is connected to said arithmetic and logic unit, said floating point unit, said instruction register, said instruction identification register, and said instruction decoder unit;
    wherein said microcode engine controls integer pipeline and floating point pipeline sequences;
    wherein said microcode engine interprets said instruction words and microcode entry points fed to it by said instruction decoder unit;
    wherein said floating point unit or said arithmetic and logic unit write new values to said instruction identification register based on results of previous operations;
    wherein said microcode engine alters said instruction opcode based on a value in said instruction identification register, by using combination logic;
    wherein said microcode engine recodes said value in said instruction identification register to one or more recoded values into third one or more scratch registers of said multiple scratch registers, by using combination logic, and said microcode engine alters said multiple operands, by logically ORing said one or more recoded values with said multiple operands, in case of in-order type processor;
    wherein said microcode engine alters said multiple operands by using a selector based on said value in said instruction identification register, in case of out-of-order type processor;
    wherein said microcode engine ensures that Read-After-Write operand dependencies are honored by said altered instruction opcode and said altered multiple operands.

* * * * *